Oct. 15, 1946.                J. I. MORRISON                2,409,304
              COMPRESSIBLE CORE FOR COOLING PIPES
                      Filed April 1, 1943

Inventor
Joseph I. Morrison

Patented Oct. 15, 1946

2,409,304

UNITED STATES PATENT OFFICE 2,409,304

COMPRESSIBLE CORE FOR COOLING PIPES

Joseph I. Morrison, Lincolnwood, Ill.

Application April 1, 1943, Serial No. 481,451

2 Claims. (Cl. 138—28)

My invention relates to a compressible core for cooling pipes.

One of the objects of my invention is to provide improved means for preventing pipes from bursting due to the freezing of a liquid therein.

More specifically, one of the objects of my invention is to provide improved means of the character indicated, having improved means for positioning a compressible core inside the pipe.

Further objects and advantages of the invention will be apparent from the description and claims.

In the drawing, in which two forms of my invention are shown,

Figure 1:
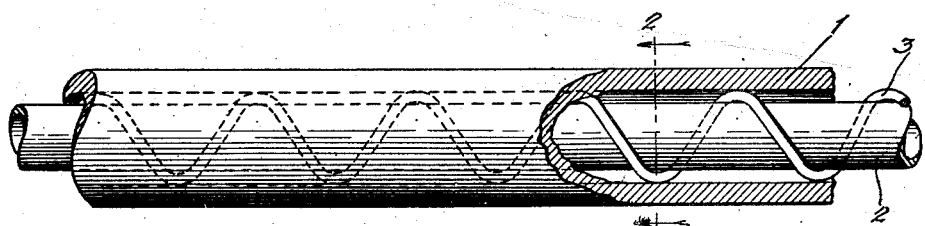
Figure 1 is a side elevational view, partly broken away, of a cooling pipe construction.
Figure 2:
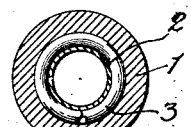
Fig. 2 is a section on the line 2—2 of Fig. 1.

Referring first to Figs. 1 and 2, the construction shown comprises a metal pipe 1 which may extend through a cooling liquid such as cold antifreeze solution, cold brine, or any suitable cooling medium or refrigerant, a compressible tubular core 2 inside said pipe extending longitudinally thereof and spaced somewhat from the inside surface of the wall thereof, and a helical coil of wire 3 surrounding the compressible core 2 and engaging the inner surface of the pipe to space the core uniformly from the pipe and provide a thin annular flow space for the liquid to be cooled. The compressible core may be of any suitable material; for example, a flexible plastic material, although other materials might be used, for example, a tubular rubber core or a solid compressible rubber core.

As the liquid to be cooled flows along the thin annular flow space between the core 2 and the inside of the pipe 1, it may, in general, follow a helical path, although the helical wire 3 may be so designed as not to fit snugly around the core and inside the pipe, leaving a restricted flow space between the wire 3 and the core 2 and between the wire and the pipe 1. This helical flow tends to create turbulence, which aids in the heat transfer by bringing all particles of the liquid film into contact with the cooling pipe.

In use, it may happen that the temperature of the cooling fluid becomes such that the liquid in the pipe freezes. If for this or any other reason the liquid in the pipe does freeze, it would be apt to cause the pipe to burst, due to the expansive action of the ice, except for the compressible core. With the compressible core installed, the expansive action of the freezing liquid compresses the core instead of bursting the pipe.

Figure 3:
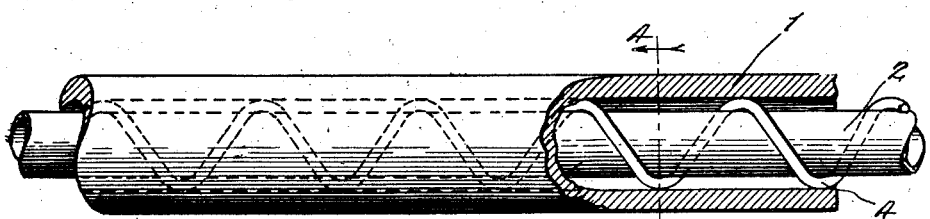
Fig. 3 is a side elevational view showing another form of cooling pipe construction.
Figure 4:
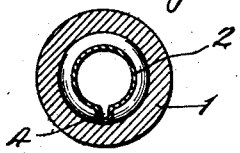
Fig. 4 is a section on the line 4—4 of Fig. 3.

The construction shown in Figs. 3 and 4 is quite similar to that just described, except that the helical formation 4, which spaces the main body of the core 2 from the pipe 1, may be made as an integral part of the core as shown clearly in cross section in Fig. 4.

Figure 5:
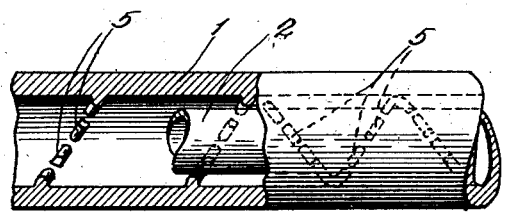
Fig. 5 is a side elevational view showing another form of cooling pipe construction.

The construction shown in Fig. 5 is quite similar to that just described, except that the helical formation 5 is formed as an integral part of the pipe 1, and this formation is made up of helical segments spaced to provide an interrupted helix. These helical projections may be cast, molded, extruded, or formed in any other suitable manner.

Further modifications will be apparent to those skilled in the art, and it is desired, therefore, that the invention be limited only by the scope of the appended claims.

Having thus described my invention, what I claim and desire to secure by Letters Patent is:

1. A cooling pipe of uniform cross section having a flexible compressible laterally bendable core of uniform cross section therein extending longitudinally of the pipe and spaced from the walls thereof to provide a liquid flow passage between the inner wall of the pipe and the outer wall of the core extending from end to end of the pipe, and means for positioning and centering the core inside the pipe comprising a helical wire surrounding the core and engaging the inside walls of the pipe, the cross-sectional area of the wires in a plane through the axis of the pipe being materially less than the cross-sectional area of the fluid passages between said helical wires in said plane.

2. A cooling pipe of uniform cross section having a flexible compressible tubular laterally bendable core of uniform cross section therein extending longitudinally of the pipe and spaced from the walls thereof to provide a liquid flow passage between the inner wall of the pipe and the outer wall of the core extending from end to end of the pipe, and means for positioning and centering the core inside the pipe comprising a helical wire surrounding the core and engaging the inside walls of the pipe, the cross-sectional area of the wires in a plane through the axis of the pipe being materially less than the cross-sectional area of the fluid passages between said helical wires in said plane.

JOSEPH I. MORRISON.